United States Patent
Malanin et al.

(10) Patent No.: US 12,407,834 B2
(45) Date of Patent: Sep. 2, 2025

(54) SYSTEMS FOR REDUCING MEDIA DATA SIZE WHILE MAINTAINING PERCEPTUAL QUALITY

(71) Applicant: SpeedSize Ltd, Netanya (IL)

(72) Inventors: Vladyslav Malanin, Odesa (UA); Sagi Keen Zamoshchik, Netanya (IL)

(73) Assignee: SpeedSize Ltd, Netanya (IL)

( * ) Notice: Subject to any disclaimer, the term of this patent is extended or adjusted under 35 U.S.C. 154(b) by 48 days.

(21) Appl. No.: 18/463,549

(22) Filed: Sep. 8, 2023

(65) Prior Publication Data

US 2024/0089467 A1 Mar. 14, 2024

Related U.S. Application Data (60) Provisional application No. 63/405,102, filed on Sep. 9, 2022, provisional application No. 63/405,107, filed on Sep. 9, 2022.

(51) Int. Cl.
*H04N 19/17* (2014.01)
*H04L 65/60* (2022.01)

(52) U.S. Cl.
CPC ............ *H04N 19/17* (2014.11); *H04L 65/60* (2013.01)

(58) Field of Classification Search
CPC ................................ H04N 19/17; H04L 65/60
See application file for complete search history.

(56) References Cited

U.S. PATENT DOCUMENTS

| | | | |
|---|---|---|---|
| 7,346,472 B1 * | 3/2008 | Moskowitz | G06F 11/30 702/182 |
| 2004/0243540 A1 * | 12/2004 | Moskowitz | H04L 63/0428 |
| 2013/0084003 A1 * | 4/2013 | Crandall | H04N 19/186 382/166 |
| 2014/0254670 A1 * | 9/2014 | Kwon | H04N 19/157 375/240.12 |
| 2015/0117791 A1 * | 4/2015 | Mertens | H04N 19/102 382/239 |
| 2017/0048482 A1 * | 2/2017 | Drako | H04N 19/61 |
| 2017/0048556 A1 * | 2/2017 | Drako | H04N 19/91 |
| 2017/0105004 A1 * | 4/2017 | Chen | H04N 19/162 |
| 2017/0105005 A1 * | 4/2017 | Chen | H04N 19/188 |
| 2017/0244962 A1 * | 8/2017 | Roskowski | H04N 7/188 |
| 2019/0297295 A1 * | 9/2019 | Roberts | G01J 1/44 |
| 2019/0320173 A1 * | 10/2019 | Alakuijala | H04N 19/117 |
| 2020/0236328 A1 * | 7/2020 | Drako | H04N 19/80 |

* cited by examiner

*Primary Examiner* — Zaihan Jiang
(74) *Attorney, Agent, or Firm* — Carr & Ferrell LLP (57) ABSTRACT

Systems for processing digital media data to reduce the size while maintaining a target perceptual quality. A device may receive an original media for processing to a target Psychovisual Compression Index (PVCI). A device may determine a plurality of Psychovisual Compression (PVC) metrics for the original media. A device may process the original media using a trained neural network to identify psychologically important features of the original media using the plurality of PVC metrics. A device may generate a resized media based on the plurality of PVC metrics and the psychologically important features of the original media, the resized media comprising the psychologically important features of the original media and being a smaller data size compared with the original media. A device may determine a Psychovisual Compression Index (PVCI) for the resized media. A device may compare the resized media to a threshold of the target PVCI.

20 Claims, 6 Drawing Sheets

SYSTEMS FOR REDUCING MEDIA DATA SIZE WHILE MAINTAINING PERCEPTUAL QUALITY

CROSS REFERENCE TO RELATED APPLICATIONS

This Patent Application claims the priority and benefit of Provisional Patent Application Ser. No. 63/405,102, filed Sep. 9, 2022, titled "Methods, Apparatus and Systems for Automatic Visual Quality Assurance" and Provisional Patent Application Ser. No. 63/405,107, filed Sep. 9, 2022, titled "Methods, Apparatus and Systems for Reducing Image Data Size While Maintaining Perceptual Quality." All of the aforementioned disclosures are hereby incorporated by reference herein in their entireties including all references and appendices cited therein.

FIELD OF THE DISCLOSURE

The present disclosure relates to methods, apparatus, and systems for processing digital media data to reduce the size of the digital media data while maintaining a target perceptual quality.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Previous approaches for reducing media data size while maintaining perceptual quality have primarily focused on traditional compression techniques such as compression algorithms. These techniques aim to reduce the file size of a media file by eliminating redundant or irrelevant information, either by discarding certain data or by encoding it in a more efficient manner. While these approaches have been effective in reducing file sizes, they often result in a loss of media quality, particularly in terms of visual perception.

In summary, previous approaches for reducing media data size while maintaining perceptual quality have relied on traditional compression techniques and simple resizing algorithms. However, none of these approaches have provided a comprehensive solution that combines the features described in this disclosure, including the use of psychovisual compression metrics to identify psychologically important features and generate resized medias (e.g., images or videos) that preserve these features, as well as the utilization of a global content delivery network (CDN) to decrease latency in delivering the resized and reformatted medias (e.g., images or videos) to website browsers.

SUMMARY

In some embodiments, the techniques described herein relate to a method for reducing a media data size while maintaining a target perceptual quality, the method including: receiving an original media (e.g., image or video) for processing to a target Psychovisual Compression Index (PVCI); determining a plurality of Psychovisual Compression (PVC) metrics for the original media; processing the original media using a trained neural network to identify psychologically important features of the original media using the plurality of Psychovisual Compression (PVC) metrics; generating a resized media based on the plurality of Psychovisual Compression (PVC) metrics and the psychologically important features of the original media, the resized media including the psychologically important features of the original media and being a smaller data size compared with the original media; determining a Psychovisual Compression Index (PVCI) for the resized media; comparing the resized media to a threshold of the target Psychovisual Compression Index (PVCI); determining that the resized media satisfies the threshold of the target Psychovisual Compression Index (PVCI); sending the resized media to a website browser on a device of a user, the sending the resized media to the website browser of the user being faster than sending the original media to the website browser of the user based on the smaller data size of the resized media compared with the original media, the resized media including the psychologically important features of the original media; receiving a previously detected media, the previously detected media satisfying the threshold of the target Psychovisual Compression Index (PVCI); formatting the previously detected media based on the website browser and a device type of the device of the user to create a reformatted previously detected media; resizing the reformatted previously detected media based on the website browser and the device type to create a resized and reformatted previously detected media; and sending the resized and reformatted previously detected media to the website browser on the device of the user, the sending the resized and reformatted previously detected media using a global content delivery network (CDN), the using the global content delivery network (CDN) decreasing latency of the sending the resized and reformatted previously detected media compared with the sending the resized media.

In some aspects, the techniques described herein relate to a method, wherein the resized media is for an image file, the image file being a Psychovisual quality of the original media and being a smaller size compared with the original media.

In some aspects, the techniques described herein relate to a method, wherein the resized media is for a video file, the video file being a Psychovisual quality of the original media and being a smaller size compared with the original media.

In some aspects, the techniques described herein relate to a method, wherein a format of the original media is one of AV1 Media File Format, Web Picture format, Joint Photographic Experts Group, Joint Photographic Experts Group-2000, Joint Photographic Experts Group-XR, Portable Network Graphic, Graphics Interchange Format, and Scalable Vector Graphics.

In some aspects, the techniques described herein relate to a method, wherein the processing the original media using a trained neural network to identify psychologically important features of the original media using the plurality of Psychovisual Compression (PVC) metrics includes removing unnecessary pixels of the original media based on the psychologically important features of the original media.

In some aspects, the techniques described herein relate to a method, further including comparing the resized media including the psychologically important features of the original media with the original media, the comparing determining that the psychologically important features of the original media in the resized media are the same as the psychologically important features of the original media.

In some aspects, the techniques described herein relate to a method, further including: comparing the resized media including the psychologically important features of the original media with the original media, the comparing determining that the psychologically important features of the original media in the resized media are not the same as the psychologically important features of the original media; determining a second plurality of Psychovisual Compression (PVC) metrics for the original media; processing the original media using the trained neural network to identify second psychologically important features of the original media using the second plurality of Psychovisual Compression (PVC) metrics; generating a second resized media based on the second plurality of Psychovisual Compression (PVC) metrics and the second psychologically important features of the original media, the second resized media including the second psychologically important features of the original media and being a smaller data size compared with the original media; determining a Psychovisual Compression Index (PVCI) for the second resized media; comparing the second resized media to the threshold of the target Psychovisual Compression Index (PVCI); determining that the second resized media satisfies the threshold of the target Psychovisual Compression Index (PVCI); and sending the second resized media to the website browser on the device of a user, the sending the second resized media to the website browser of the user being faster than sending the original media to the website browser of the user based on the smaller data size of the second resized media compared with the original media, the second resized media including the second psychologically important features of the original media.

In some aspects, the techniques described herein relate to a method, further including: iteratively generating resized medias based on the plurality of Psychovisual Compression (PVC) metrics; comparing the iteratively generated resized medias to the threshold of the target Psychovisual Compression Index (PVCI); determining that the iteratively generated resized medias satisfy the threshold of the target Psychovisual Compression Index (PVCI); and sending the iteratively generated resized medias to the website browser on the device of a user, the sending the iteratively generating resized medias to the website browser of the user being faster than sending the original media to the website browser of the user based on the smaller data size of the second resized media compared with the original media.

In some aspects, the techniques described herein relate to an apparatus for reducing a media data size while maintaining a target perceptual quality, including: at least one memory storing computer program instructions; and at least one processor configured to execute the computer program instructions to cause the apparatus at least to perform the following operations: receiving an original media for processing to a target Psychovisual Compression Index (PVCI); determining a plurality of Psychovisual Compression (PVC) metrics for the original media; processing the original media using a trained neural network to identify psychologically important features of the original media using the plurality of Psychovisual Compression (PVC) metrics; generating a resized media based on the plurality of Psychovisual Compression (PVC) metrics and the psychologically important features of the original media, the resized media including the psychologically important features of the original media and being a smaller data size compared with the original media; determining a Psychovisual Compression Index (PVCI) for the resized media; comparing the resized media to a threshold of the target Psychovisual Compression Index (PVCI); determining that the resized media satisfies the threshold of the target Psychovisual Compression Index (PVCI); sending the resized media to a website browser on a device of a user, the sending the resized media to the website browser of the user being faster than sending the original media to the website browser of the user based on the smaller data size of the resized media compared with the original media, the resized media including the psychologically important features of the original media; receiving a previously detected media, the previously detected media satisfying the threshold of the target Psychovisual Compression Index (PVCI); formatting the previously detected media based on the website browser and a device type of the device of the user to create a reformatted previously detected media; resizing the reformatted previously detected media based on the website browser and the device type to create a resized and reformatted previously detected media; and sending the resized and reformatted previously detected media to the website browser on the device of the user, the sending the resized and reformatted previously detected media using a global content delivery network (CDN), the using the global content delivery network (CDN) decreasing latency of the sending the resized and reformatted previously detected media compared with the sending the resized media.

In some aspects, the techniques described herein relate to an apparatus, wherein the resized media is for an image file, the image file being a Psychovisual quality of the original media and being a smaller size compared with the original media.

In some aspects, the techniques described herein relate to an apparatus, further including comparing the resized media including the psychologically important features of the original media with the original media, the comparing determining that the psychologically important features of the original media in the resized media are the same as the psychologically important features of the original media.

In some aspects, the techniques described herein relate to an apparatus, further including: comparing the resized media including the psychologically important features of the original media with the original media, the comparing determining that the psychologically important features of the original media in the resized media are not the same as the psychologically important features of the original media; determining a second plurality of Psychovisual Compression (PVC) metrics for the original media; processing the original media using the trained neural network to identify second psychologically important features of the original media using the second plurality of Psychovisual Compression (PVC) metrics; generating a second resized media based on the second plurality of Psychovisual Compression (PVC) metrics and the second psychologically important features of the original media, the second resized media including the second psychologically important features of the original media and being a smaller data size compared with the original media; determining a Psychovisual Compression Index (PVCI) for the second resized media; comparing the second resized media to the threshold of the target Psychovisual Compression Index (PVCI); determining that the second resized media satisfies the threshold of the target Psychovisual Compression Index (PVCI); and sending the second resized media to the website browser on the device of a user, the sending the second resized media to the website browser of the user being faster than sending the original media to the website browser of the user based on the smaller data size of the second resized media compared with the original media, the second resized media including the second psychologically important features of the original media.

In some aspects, the techniques described herein relate to a system for reducing the data size of a media while maintaining a target perceptual quality, including: one or more hardware processors configured by machine-readable instructions to perform the following operations: receiving an original media for processing to a target Psychovisual Compression Index (PVCI); determining a plurality of Psychovisual Compression (PVC) metrics for the original media; processing the original media using a trained neural network to identify psychologically important features of the original media using the plurality of Psychovisual Compression (PVC) metrics; generating a resized media based on the plurality of Psychovisual Compression (PVC) metrics and the psychologically important features of the original media, the resized media including the psychologically important features of the original media and being a smaller data size compared with the original media; determining a Psychovisual Compression Index (PVCI) for the resized media; comparing the resized media to a threshold of the target Psychovisual Compression Index (PVCI); determining that the resized media satisfies the threshold of the target Psychovisual Compression Index (PVCI); sending the resized media to a website browser on a device of a user, the sending the resized media to the website browser of the user being faster than sending the original media to the website browser of the user based on the smaller data size of the resized media compared with the original media, the resized media including the psychologically important features of the original media; receiving a previously detected media, the previously detected media satisfying the threshold of the target Psychovisual Compression Index (PVCI); formatting the previously detected media based on the website browser and a device type of the device of the user to create a reformatted previously detected media; resizing the reformatted previously detected media based on the website browser and the device type to create a resized and reformatted previously detected media; and sending the resized and reformatted previously detected media to the website browser on the device of the user, the sending the resized and reformatted previously detected media using a global content delivery network (CDN), the using the global content delivery network (CDN) decreasing latency of the sending the resized and reformatted previously detected media compared with the sending the resized media.

In some aspects, the techniques described herein relate to a system, wherein the resized media is for an image file, the image file being a Psychovisual quality of the original media and being a smaller size compared with the original media.

In some aspects, the techniques described herein relate to a system, wherein the resized media is for a video file, the video file being a Psychovisual quality of the original media and being a smaller size compared with the original media.

In some aspects, the techniques described herein relate to a system, wherein a format of the original media is one of AV1 Media File Format, Web Picture format, Joint Photographic Experts Group, Joint Photographic Experts Group-2000, Joint Photographic Experts Group-XR, Portable Network Graphic, Graphics Interchange Format, and Scalable Vector Graphics.

In some aspects, the techniques described herein relate to a system, wherein the processing the original media using a trained neural network to identify psychologically important features of the original media using the plurality of Psychovisual Compression (PVC) metrics includes removing unnecessary pixels of the original media based on the psychologically important features of the original media.

In some aspects, the techniques described herein relate to a system, further including comparing the resized media including the psychologically important features of the original media with the original media, the comparing determining that the psychologically important features of the original media in the resized media are the same as the psychologically important features of the original media.

In some aspects, the techniques described herein relate to a system, wherein the one or more hardware processors are further configured by machine-readable instructions to further perform the following operations: comparing the resized media including the psychologically important features of the original media with the original media, the comparing determining that the psychologically important features of the original media in the resized media are not the same as the psychologically important features of the original media; determining a second plurality of Psychovisual Compression (PVC) metrics for the original media; processing the original media using the trained neural network to identify second psychologically important features of the original media using the second plurality of Psychovisual Compression (PVC) metrics; generating a second resized media based on the second plurality of Psychovisual Compression (PVC) metrics and the second psychologically important features of the original media, the second resized media including the second psychologically important features of the original media and being a smaller data size compared with the original media; determining a Psychovisual Compression Index (PVCI) for the second resized media; comparing the second resized media to the threshold of the target Psychovisual Compression Index (PVCI); determining that the second resized media satisfies the threshold of the target Psychovisual Compression Index (PVCI); and sending the second resized media to the website browser on the device of a user, the sending the second resized media to the website browser of the user being faster than sending the original media to the website browser of the user based on the smaller data size of the second resized media compared with the original media, the second resized media including the second psychologically important features of the original media.

In some aspects, the techniques described herein relate to a system, wherein the one or more hardware processors are further configured by machine-readable instructions to further perform the following operations: iteratively generating resized medias based on the plurality of Psychovisual Compression (PVC) metrics; comparing the iteratively generated resized medias to the threshold of the target Psychovisual Compression Index (PVCI); determining that the iteratively generated resized medias satisfy the threshold of the target Psychovisual Compression Index (PVCI); and sending the iteratively generated resized medias to the website browser on the device of a user, the sending the iteratively generating resized medias to the website browser of the user being faster than sending the original media to the website browser of the user based on the smaller data size of the second resized media compared with the original media.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices may be shown in block diagram form only in order to avoid obscuring the disclosure. It should be understood, that the disclosed embodiments are merely exemplary of the invention, which may be embodied in multiple forms. Those details disclosed herein are not to be interpreted in any form as limiting, but as the basis for the claims.

Medias (e.g., images or videos) on the World Wide Web (Web) (i.e., a subset of the Internet consisting of the webpages that can be accessed by a Web browser) can be large even if compressed with standard media compression schemes including but not limited to Joint Photographic Experts Group (JPEG) for an image. Large media files (e.g., image or video) require more time to transmit and consume other system resources. The methods, apparatus and systems of the present technology reduce the data size of a media (e.g., image or video) while maintaining a media perceptual quality of the media (e.g., image or video). For example, the media may be an image or a video. Important areas of a media file (e.g., image or video) are compressed less than unimportant areas of the media are compressed more, which results in the media compression having a decreased effect on media quality. Further, different types of compression are used iteratively if required to maintain a perceived target media quality.

According to various embodiments, to provide the media data size reduction while maintaining the perceived media quality, ninety or more metrics are identified related to the perceived media quality. These metrics can include features in a media file (e.g., image file or video file), the effects of compression, the amount of compression, and compression algorithm used on the media (e.g., image or video). These metrics are used in conjunction with the media file to compute a Psychovisual Compression Index (PVCI).

According to some embodiments, in conjunction with the Psychovisual Compression Index (PVCI), a neural network or a deep neural network is trained to identify which parts of a media (e.g., image or video) are important for visual quality. These are the parts that are important for visual quality which are attention getting and grab eye focus of a viewer. Examples of the important areas are faces of people and body parts, and brands. Examples of unimportant areas are areas where the media (e.g., image or video) is flat and has low detail.

According to some embodiments, using Artificial Intelligence (AI) and neuroscience, the present technology understands how the brain perceives visual information. The present technology automatically analyzes over one hundred elements per image or video frame to determine what the human brain can and cannot perceive. Each pixel is treated uniquely in the context of the whole, and given the best optimization method.

According to some embodiments, the present technology breaks the media (e.g., image or video) apart and removes the unnecessary pixels that cannot be seen by the human eye. Each AI-optimized media (e.g., image or video) is rebuilt as an indistinguishable variation, preserving the original high quality but up to ninety-nine percent smaller in file size.

According to some embodiments, the present technology analyzes using Artificial Intelligence (AI) a media file (e.g., image file or video file). The present technology is designed to simulate perception by the brain of visual media using neuroscience. The present technology AI-analyzes human visual limitations to understand what a human mind actually processes when the human mind receives visual signals when a person looks at media (e.g., image or video). The present technology then AI-optimizes according to those visual processes.

According to some embodiments, the present technology the AI-automation recognizes what each pixel represents, for example, text, facial features, product, colors. Next, the platform of the present technology decides which are the most important elements to the user, what shades and data are not visible to the human eye, and other metrics. When all that information is gathered, AI of the present technology automatically configures the updated size to quality ratio for every image and video. Then the AI-algorithm has sufficient data to move forward and rebuild an identical quality media file (e.g., image file or video file) but up to ninety-nine percent smaller in size.

According to some embodiments, the present technology performs a media-rebuild. The present technology takes apart the whole media (e.g., image or video) and clears the whole media of all the unnecessary pixels the human eye cannot see and the wasteful information is removed from the file. For example, each AI-optimized image and video is rebuilt through a process of trial and error, driven by machine learning. The present technology preserves the initial quality, but with ninety to ninety-nine percent smaller in file size. Once a smaller duplicate media (e.g., image or video) is made, the present technology compares the newly constructed media to the original as its own kind of visual quality failsafe, to ensure the medias (e.g., images or videos) are identical to human perception.

According to some embodiments, the present technology uses a Psychovisual Compression Index (PVCI), which is a tool that enables the present technology to make media substantially smaller without compromising visual quality. In most cases, the higher the quality of the media (e.g., image or video), the more a size of the media can be reduced, simply because AI-algorithm of the present technology has more data to work from.

According to some embodiments, the present technology uses edge delivery. For example, when a media file (e.g., image file or video file), is reached by a visitor on website, the AI-algorithm of the present technology optimizes the media files (e.g., image files or video files) on the website. The present technology does this at scale, no matter how many relevant images or videos a website contains. For example, the media file will be replaced with faster loading, identical-looking media file to human perception, perfectly resized for up to fifty different screen resolutions, to match the device and browser of a user with the global edge content delivery network (CDN) of the present technology. For example, the present technology may automatically select the closest data center to the visitor, out of four-hundred points around the world, for the most efficient routing and the fastest delivery to reduce latency. For example, on the first request to media file (cache-miss event), depending on the configuration, the global edge content delivery network (CDN) of the present technology may respond with either a 302 redirect (e.g., the HTTP response status code 302 Found is a common way of performing URL redirection) to the original media file (e.g., image file or video file), or generates a temporary real-time media file (e.g., image file or video file). The present technology updates the cache upon the progress of processing with a max-age step of six hundred seconds (ten minutes). Once all the possible processing for the requested transformation is done, the response is cached with the biggest supported value of max age of 31,536,000 seconds (one year). In some instances, requests are cached based on the supported formats and the required media file resolution evaluated from the Accept, User-Agent and Client-Hints request headers. If the present technology infrastructure cannot reach the origin, the present technology global CDN of the present technology will respond with a 302 redirect to the original asset with the max-age value growing with each consequent failed attempt.

According to some embodiments, the present technology delivers each media file (e.g., image file or video file) from an edge content delivery network (CDN) of the present technology. The present technology automatically chooses the best format, resolution, crop, visual quality, and file size, to perfectly match each media (e.g., image or video) for each individual device and browser of each user.

Figure 1:
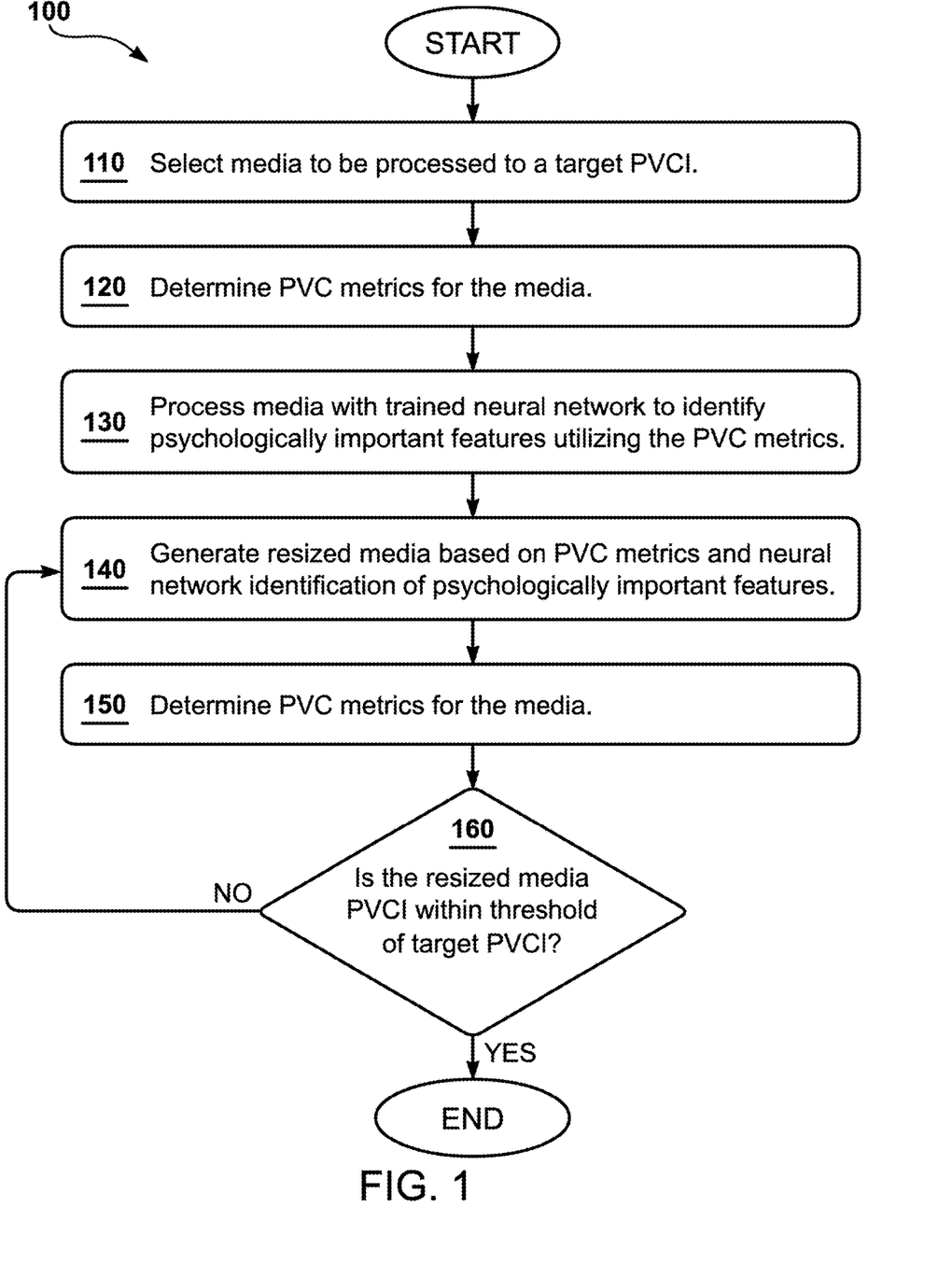
FIG. 1 illustrates a method of processing digital media data to reduce the size of the digital media data while maintaining a target psychovisual quality, according to various embodiments of the present technology.

According to some embodiments, FIG. 1 illustrates a method 100 of processing digital media data to reduce the size of the digital media data while maintaining a target psychovisual level. For example, the Psychovisual Compression Index (PVCI) of an original uncompressed media is 1.0. For the application or website, a Psychovisual Compression Index (PVCI) of 0.95 may be perceived as an acceptable optimizing file size and quality of media (e.g., a video or image). For example, a goal is to reduce a file size of a media (e.g., image file or video file) to help improve performance of a website.

According to some embodiments, in step 110, a digital media (e.g., image file or video file) that is to have a data size of the digital media reduced and a target Psychovisual Compression Index (PVCI) value is selected. For example, the media may be an image of the following formats, JPEG, GIF, PNG, JPEG 2000, WebP, HEIF, AVIF, TIFF, BMP, PPM, PGM, PBM, and PNM, just to name a few. For example, the media may be a video of the following formats MP4, MOV, MP4, M4P, M4V, AVI, WMV, MKV, AVCHD, WEBM, FLV, and SWF just to name a few.

The media (e.g., image or video) may be stored on a server or processing workstation or received over a network. The media (e.g., image or video) may be selected by a user or be part of an automated processing system or tool.

According to some embodiments, in step 120, the media (e.g., image or video) is processed to determine the Psychovisual Compression Index (PVCI) metrics. These metrics can include but are not limited to a determination of the pixel dynamic range within a media (e.g., image or video), variance, and color, and the like.

Figure 4:
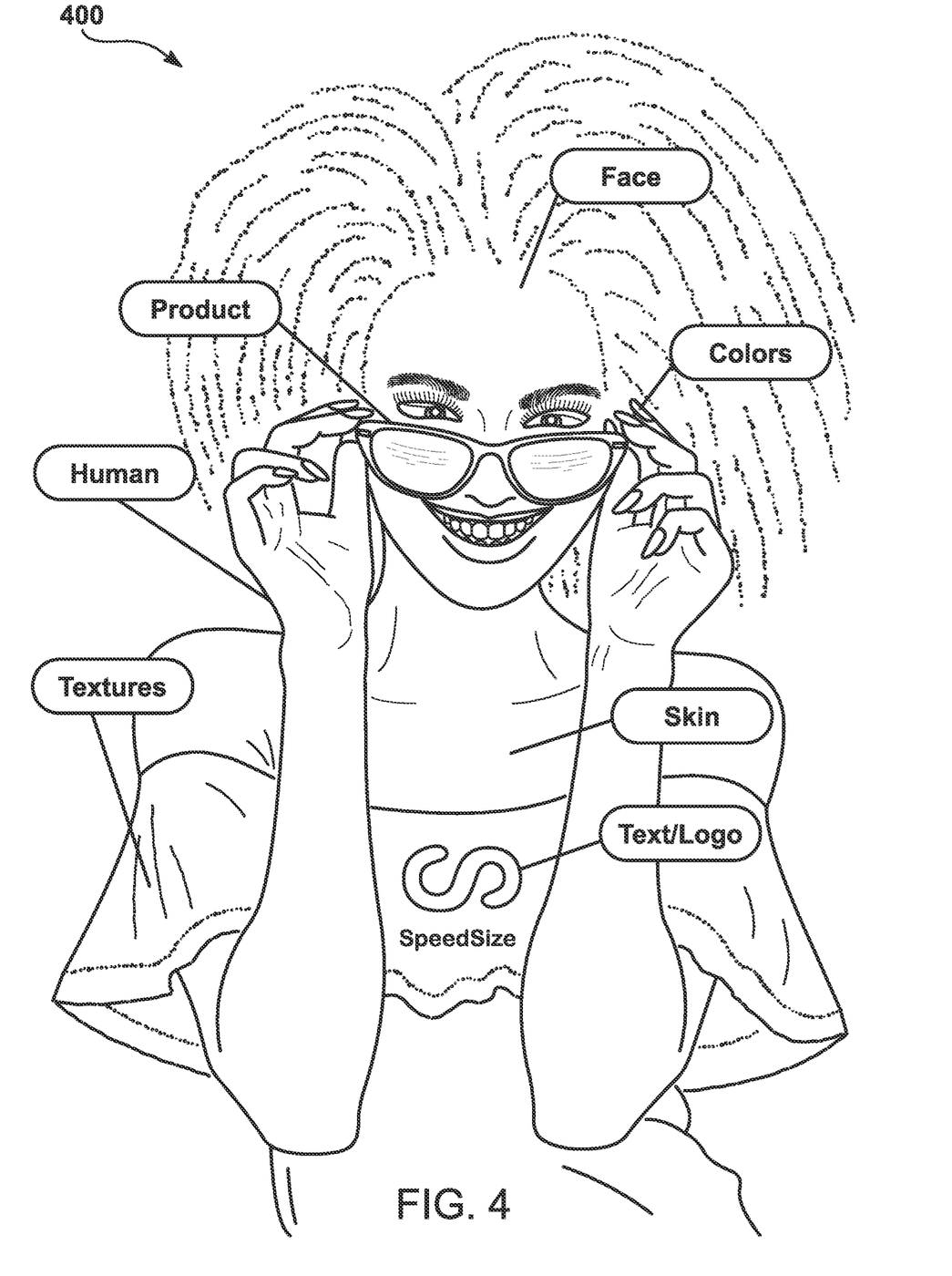
FIG. 4 illustrates a media after identifying which parts of a media are important for visual quality, according to various embodiments of the present technology.

According to some embodiments, in step 130, the media (e.g., image or video) is processed by a neural network to determine psychologically important features of the media (e.g., image or video). The important features are the areas of a media (e.g., image or video) that a viewer's eye is drawn to and provide a subjective user impression of the visual quality of the media (e.g., image or video). Examples of the important parts or areas of a media (e.g., image or video) are faces and other body parts. Any feature that is determined to be attention grabbing may be an important feature. These important features could include an object identified by the neural network being held in the hand of a person. Further examples of important features could include an object that a person is looking at, pointing at, and objects or areas in the direction that a person is moving. For example, exemplary important parts or areas of a media (e.g., image) are shown in FIG. 4. Different neural networks may be used to identify the important features. For example, medias (e.g., images or videos) related to botany might use a neural network trained to identify flowers as the important features. For a given context, the importance of specific objects may be elevated or reduced.

According to some embodiments, in step 140, the data size of the media (e.g., image or video) is resized. The resizing is performed based on the psychologically important features identified by the neural network and the Psychovisual Compression Index (PVCI) metrics of the media. The resizing performed is to the best size-to-quality ratio of images/video. For instance, a resized media (e.g., image or video) is the original quality and is also the smaller size as compared to the original media.

According to some embodiments, in step 150, a resized Psychovisual Compression Index (PVCI) is generated based on the resized media. The first time the media (e.g., image or video) is resized the data size of the media is smaller and the Psychovisual Compression Index (PVCI) is reduced. However, in further iterations of the resizing, if the target Psychovisual Compression Index (PVCI) is overshot by more than a threshold amount, the resizing may increase the data size of the media (e.g., image or video).

According to some embodiments, in step 160, the resized media Psychovisual Compression Index (PVCI) is generated. The resized media Psychovisual Compression Index (PVCI) is compared to the prespecified target Psychovisual Compression Index (PVCI). If the difference is not within a threshold, then the process is repeated starting at step 140. If the difference is within the threshold, then the processing of the media (e.g., image or video) ends.

Figure 2:
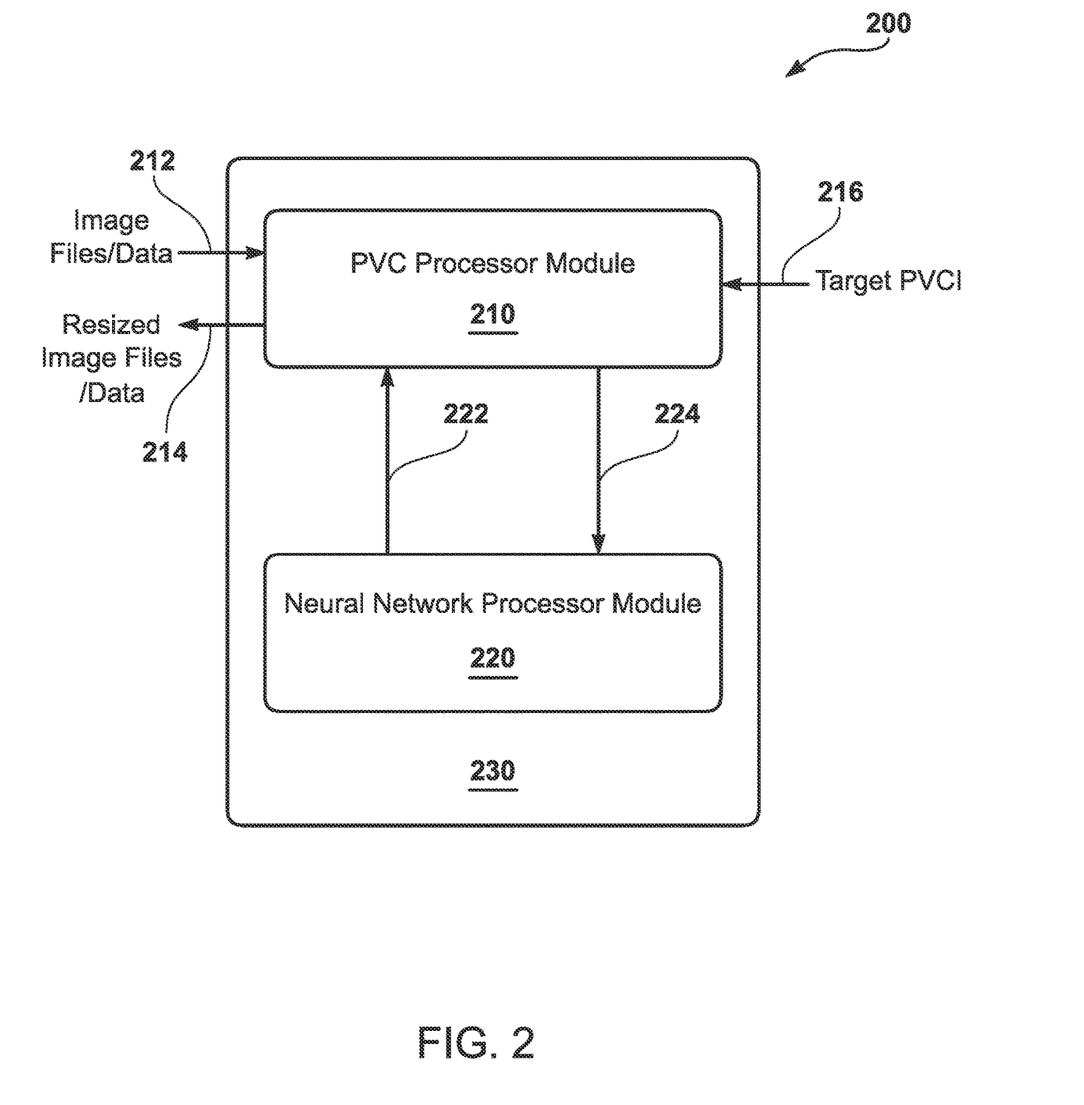
FIG. 2 illustrates a system configured for processing digital media data to reduce the size of the digital media data while maintaining a target psychovisual quality, according to various embodiments of the present technology.

FIG. 2 illustrates a system 200 configured for processing a digital media data to reduce a data size of the media (e.g., image or video) while maintaining a target psychovisual level of perception, in accordance with one or more embodiments of the present technology. In some cases, system 200 may include one or more computing platforms 230, for example, the computing system shown in FIG. 6. The one or more computing platforms 230 may be remote computing platforms that may be communicably coupled with one or more remote platforms (not shown). In some cases, users may access the system 200 via a remote platform(s).

According to various embodiments, the one or more computing platforms 230 may be configured by PVC processor module 210 comprising machine-readable instructions and neural network processor module 220 comprising machine-readable instructions. The modules (e.g., PVC processor module 210 and neural network processor module 220) may be implemented as one or more of functional logic, hardware logic, electronic circuitry, software modules, and the like.

According to various embodiments, the PVC processor module 210 may be a separate processor, a separate server, or a module within a computational device. The PVC processor module 210 receives media files (e.g., image file or video file) or media data 212 (e.g., image data or video data) from local or remote storage (not shown). The PVC processor module 210 computes a Psychovisual Compression Index (PVCI) for a media (e.g., image or video). Additionally, the PVC processor module 210 computes PVC metrics for the media (e.g., image or video).

According to various embodiments, the PVC processor module 210 provides the PVC metrics and media data 224 to the neural network processor module 220. The neural network processor module 220 identifies the important areas of the media and sends this information 222 back to the PVC processor module 210. Using the information from the neural network processor module 220 and the PVC metrics, the PVC processor module 210 resizes the media (e.g., image or video). The media resizing can be but is not limited to increasing or decreasing the compression on areas of a media (e.g., image or video). The resizing performed is to the best size-to-quality ratio of images/video. For instance, a resized media (e.g., image or video) is the original quality and is also the smaller size as compared to the original media. A target PVCI 216 may be received by the PVC processor module. The PVC processor module 210 may iteratively resize the media (e.g., image or video) until the media satisfies the target PVCI. The PVC processor module 210 may process the resized media 214 that satisfies the target PVCI for sending [214] to the website of a user.

According to some embodiments, the one or more computing platforms 230, may be communicatively coupled to the remote platform(s) (not shown). In some cases, the communicative coupling may include communicative coupling through a networked environment (not shown). The networked environment may be a radio access network, such as LTE or 5G, a local area network (LAN), a wide area network (WAN) such as the Internet, or wireless LAN (WLAN), for example. It will be appreciated that this is not intended to be limiting, and that the scope of this disclosure includes implementations in which one or more computing platforms 230 and remote platform(s) may be operatively linked via some other communication coupling. The one or more computing platforms 230 may be configured to communicate with the networked environment via wireless or wired connections. Examples of one or more computing platforms 230 may include, but is not limited to, laptop computers, servers, or desktop computers. In an embodiment, system 200 may also include one or more hosts or servers, such as the one or more remote platforms connected to the networked environment through wireless or wired connections.

According to some embodiments, the one or more computing platforms 230 may include one or more processors (not shown) for processing information and executing instructions or operations. One or more processors may be any type of general or specific purpose processor. In some cases, multiple processors may be utilized according to other embodiments. In fact, the one or more processors may include one or more of general-purpose computers, special purpose computers, microprocessors, digital signal processors (DSPs), field-programmable gate arrays (FPGAs), application-specific integrated circuits (ASICs), neural network processors, and processors based on a multi-core processor architecture, as examples. In some cases, the one or more processors may be remote from the one or more computing platforms 230, such as disposed within a remote platform like the one or more computing platforms 230 of FIG. 2, which may be one or more remote platforms.

According to some embodiments, the one or more processors may perform functions associated with the operation of system 200 which may include, for example, encoding and decoding of individual bits forming a communication message, formatting of information, and overall control of the one or more computing platforms 230, including processes related to management of communication resources.

According to some embodiments, the one or more computing platforms 230 may further include or be coupled to a memory (internal or external), which may be coupled to one or more processors, for storing information and instructions that may be executed by one or more processors. Memory (not shown) may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory can consist of any combination of random-access memory (RAM), read only memory (ROM), static storage such as a magnetic or optical disk, hard disk drive (HDD), or any other type of non-transitory machine or computer readable media. The instructions stored in memory may include program instructions or computer program code that, when executed by one or more processors, enable the one or more computing platforms 230 to perform tasks as described herein.

Figure 3:
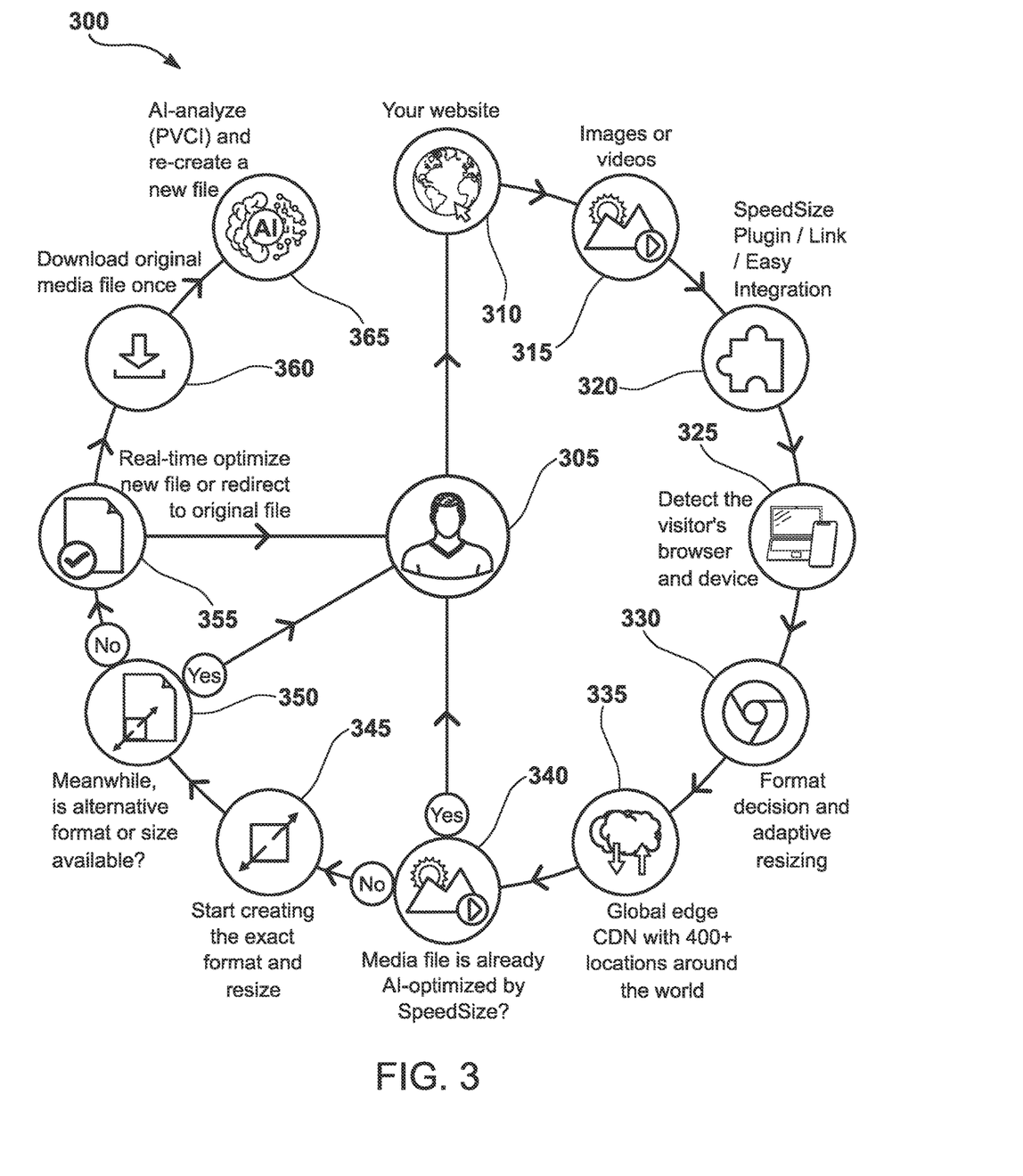
FIG. 3 illustrates a method of processing digital media data to reduce the size of the digital media data while maintaining a target psychovisual quality, according to various embodiments of the present technology.

FIG. 3 illustrates a method 300 of processing digital media data to reduce the size of the digital media data while maintaining a target psychovisual quality, according to various embodiments of the present technology. According to various embodiments at step 310, a user 305 accesses a website. At step 315, the user 305 accesses a media file (e.g., an image file or a video file) using the website. At step 320, a plugin/link/script executes in response to accessing the media file (e.g., an image file or a video file) by the user 305 using the website. At step 325, the plugin/link/script automatically detects a browser and device of the user 305 that is used in step 310, accessing the website, for example, using easy integration. At step 330, the system automatically adaptive resizes the media file based on the browser and the device of the user 305. At step 335, the media file is delivered to the user 305 using a global content delivery network (CDN). The CDN may use proxy or custom API integration for any CDN. For example, the global CDN may be Amazon CloudFront, which uses a global network of over points of presence (POP) in over ninety cities across more than forty-seven countries to ensure the delivery of the media file with low latency. At step 340, the present technology determines if the media file is already optimized by the present technology. If yes, the media file is delivered to the user 305 using the global CDN. If not, the method 300 continues. At step 345, an exact format is created and resizing begins. At step 350, a determination is made if an alternative format or size is available. If yes, the alternative format or the alternative size is delivered to the user. If not, the method 300 continues. At step 355, real-time optimizing of a new file or redirecting to the original file occurs. At step 360, the original media file is downloaded one time. At step 365, the media file is analyzed using AI and an optimized media file is re-created as described in FIG. 1.

FIG. 4 illustrates a media 400 after identifying which parts of a media are important for visual quality, according to various embodiments of the present technology. The media 400 shows examples of the important parts or areas of a media (e.g., an image) including a face and other body parts of a human. Any feature that is determined to be attention grabbing may be an important feature including a product placement for a brand or a logo. For example, important features may be texture, human body part including a face or skin tone, a product, a color, and text/logos of a brand. These important features could include an object identified by the neural network being held in the hand of a person. Further examples of important features could include an object that a person is looking at, pointing at, and objects or areas the direction that a person is moving.

Figure 5:
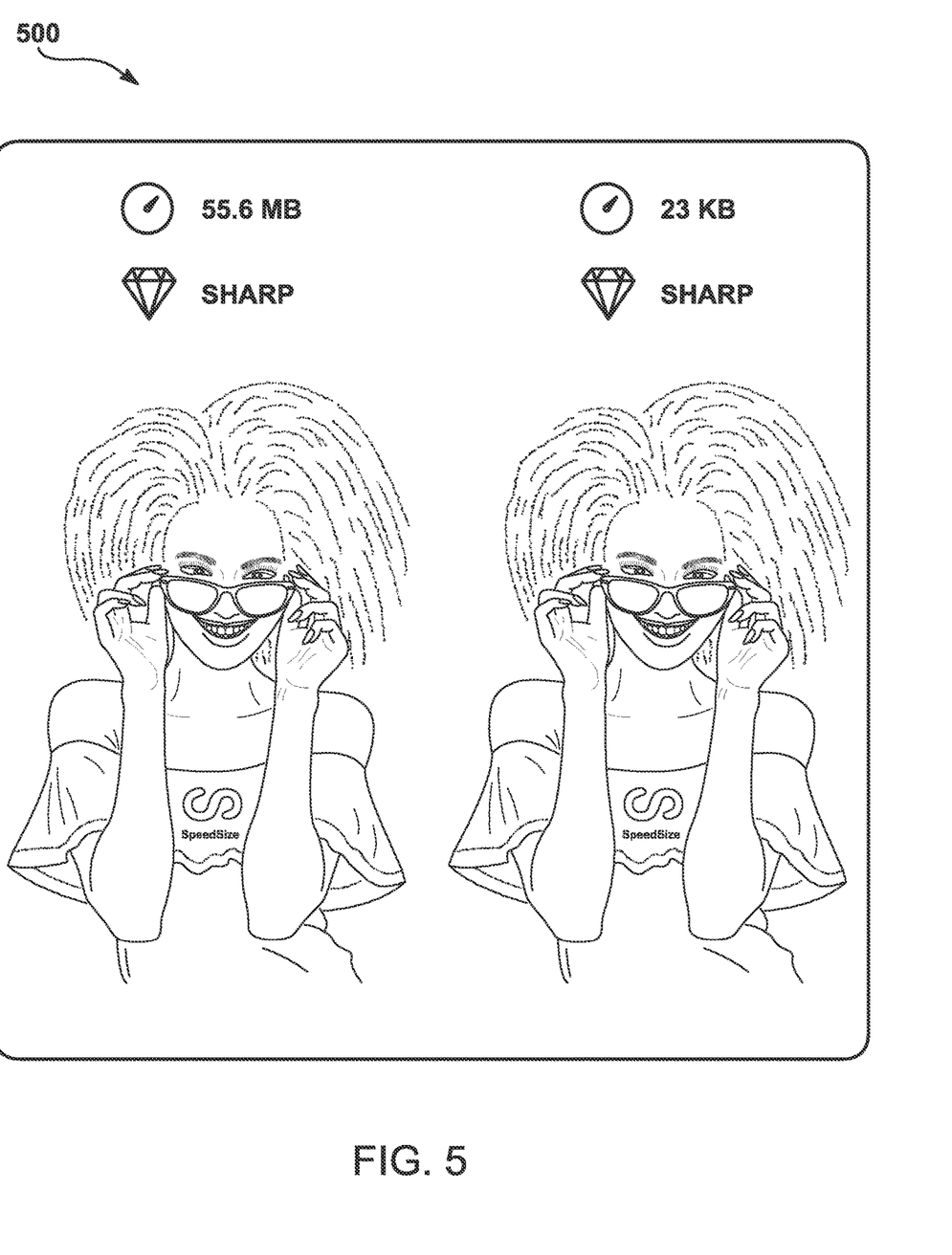
FIG. 5 illustrates a comparison of medias after identifying which parts of a media are important for visual quality, according to various embodiments of the present technology.

FIG. 5 illustrates a comparison of medias 500 after identifying which parts of a media (e.g., an image or a video) are important for visual quality, according to various embodiments of the present technology. The comparison of medias 500 is an example of generating a resized media based on the plurality of Psychovisual Compression Index (PVCI) metrics and the psychologically important features of the original media (e.g., an image or a video), the resized media comprising the psychologically important features of the original media and being a smaller data size compared with the original media. For example, the resized media, may be twenty-three Kilobytes (KB), comprising the psychologically important features of the original media (e.g., an image or a video) and being a smaller data size (e.g., twenty-three KB) compared with the original media that may be fifty-five Megabytes (MB).

Some embodiments include a method for reducing a media data size while maintaining a target perceptual quality, the method comprising: receiving an original media for processing to a target Psychovisual Compression Index (PVCI); determining a plurality of Psychovisual Compression (PVC) metrics for the original media; processing the original media using a trained neural network to identify psychologically important features of the original media using the plurality of Psychovisual Compression (PVC) metrics; generating a resized media based on the plurality of Psychovisual Compression (PVC) metrics and the psychologically important features of the original media, the resized media comprising the psychologically important features of the original media and being a smaller data size compared with the original media; determining a Psychovisual Compression Index (PVCI) for the resized media; comparing the resized media to a threshold of the target Psychovisual Compression Index (PVCI); determining that the resized media satisfies the threshold of the target Psychovisual Compression Index (PVCI); sending the resized media to a website browser on a device of a user, the sending the resized media to the website browser of the user being faster than sending the original media to the website browser of the user based on the smaller data size of the resized media compared with the original media, the resized media comprising the psychologically important features of the original media; receiving a previously detected media, the previously detected media satisfying the threshold of the target Psychovisual Compression Index (PVCI); formatting the previously detected media based on the website browser and a device type of the device of the user to create a reformatted previously detected media; resizing the reformatted previously detected media based on the website browser and the device type to create a resized and reformatted previously detected media; and sending the resized and reformatted previously detected media to the website browser on the device of the user, the sending the resized and reformatted previously detected media using a global content delivery network (CDN), the using the global content delivery network (CDN) decreasing latency of the sending the resized and reformatted previously detected media compared with the sending the resized media.

In some embodiments the resized media is for an image file, the image file being a Psychovisual quality of the original media and being a smaller size compared with the original media.

In some embodiments the resized media is for a video file, the video file being a Psychovisual quality of the original media and being a smaller size compared with the original media.

In various embodiments a format of the original media is one of AV1 Media File Format, Web Picture format, Joint Photographic Experts Group, Joint Photographic Experts Group-2000, Joint Photographic Experts Group-XR, Portable Network Graphic, Graphics Interchange Format, and Scalable Vector Graphics.

In various embodiments the processing the original media using a trained neural network to identify psychologically important features of the original media using the plurality of Psychovisual Compression (PVC) metrics includes removing unnecessary pixels of the original media based on the psychologically important features of the original media.

Various embodiments further include comparing the resized media comprising the psychologically important features of the original media with the original media, the comparing determining that the psychologically important features of the original media in the resized media are the same as the psychologically important features of the original media.

Various embodiments further include comparing the resized media comprising the psychologically important features of the original media with the original media, the comparing determining that the psychologically important features of the original media in the resized media are not the same as the psychologically important features of the original media; determining a second plurality of Psychovisual Compression (PVC) metrics for the original media; processing the original media using the trained neural network to identify second psychologically important features of the original media using the second plurality of Psychovisual Compression (PVC) metrics; generating a second resized media based on the second plurality of Psychovisual Compression (PVC) metrics and the second psychologically important features of the original media, the second resized media comprising the second psychologically important features of the original media and being a smaller data size compared with the original media; determining a Psychovisual Compression Index (PVCI) for the second resized media; comparing the second resized media to the threshold of the target Psychovisual Compression Index (PVCI); determining that the second resized media satisfies the threshold of the target Psychovisual Compression Index (PVCI); and sending the second resized media to the website browser on the device of a user, the sending the second resized media to the website browser of the user being faster than sending the original media to the website browser of the user based on the smaller data size of the second resized media compared with the original media, the second resized media comprising the second psychologically important features of the original media.

Various embodiments further include iteratively generating resized medias based on the plurality of Psychovisual Compression (PVC) metrics; comparing the iteratively generated resized medias to the threshold of the target Psychovisual Compression Index (PVCI); determining that the iteratively generated resized medias satisfy the threshold of the target Psychovisual Compression Index (PVCI); and sending the iteratively generated resized medias to the website browser on the device of a user, the sending the iteratively generating resized medias to the website browser of the user being faster than sending the original media to the website browser of the user based on the smaller data size of the second resized media compared with the original media.

Various embodiments include an apparatus for reducing a media data size while maintaining a target perceptual quality, comprising: at least one memory storing computer program instructions; and at least one processor configured to execute the computer program instructions to cause the apparatus at least to perform the following operations: receiving an original media for processing to a target Psychovisual Compression Index (PVCI); determining a plurality of Psychovisual Compression (PVC) metrics for the original media; processing the original media using a trained neural network to identify psychologically important features of the original media using the plurality of Psychovisual Compression (PVC) metrics; generating a resized media based on the plurality of Psychovisual Compression (PVC) metrics and the psychologically important features of the original media, the resized media comprising the psychologically important features of the original media and being a smaller data size compared with the original media; determining a Psychovisual Compression Index (PVCI) for the resized media; comparing the resized media to a threshold of the target Psychovisual Compression Index (PVCI); determining that the resized media satisfies the threshold of the target Psychovisual Compression Index (PVCI); sending the resized media to a website browser on a device of a user, the sending the resized media to the website browser of the user being faster than sending the original media to the website browser of the user based on the smaller data size of the resized media compared with the original media, the resized media comprising the psychologically important features of the original media; receiving a previously detected media, the previously detected media satisfying the threshold of the target Psychovisual Compression Index (PVCI); formatting the previously detected media based on the website browser and a device type of the device of the user to create a reformatted previously detected media; resizing the reformatted previously detected media based on the website browser and the device type to create a resized and reformatted previously detected media; and sending the resized and reformatted previously detected media to the website browser on the device of the user, the sending the resized and reformatted previously detected media using a global content delivery network (CDN), the using the global content delivery network (CDN) decreasing latency of the sending the resized and reformatted previously detected media compared with the sending the resized media.

In various embodiments the resized media is for an image file, the image file being a Psychovisual quality of the original media and being a smaller size compared with the original media.

Various embodiments further include comparing the resized media comprising the psychologically important features of the original media with the original media, the comparing determining that the psychologically important features of the original media in the resized media are the same as the psychologically important features of the original media.

Various embodiments further include comparing the resized media comprising the psychologically important features of the original media with the original media, the comparing determining that the psychologically important features of the original media in the resized media are not the same as the psychologically important features of the original media; determining a second plurality of Psychovisual Compression (PVC) metrics for the original media; processing the original media using the trained neural network to identify second psychologically important features of the original media using the second plurality of Psychovisual Compression (PVC) metrics; generating a second resized media based on the second plurality of Psychovisual Compression (PVC) metrics and the second psychologically important features of the original media, the second resized media comprising the second psychologically important features of the original media and being a smaller data size compared with the original media; determining a Psychovisual Compression Index (PVCI) for the second resized media; comparing the second resized media to the threshold of the target Psychovisual Compression Index (PVCI); determining that the second resized media satisfies the threshold of the target Psychovisual Compression Index (PVCI); and sending the second resized media to the website browser on the device of a user, the sending the second resized media to the website browser of the user being faster than sending the original media to the website browser of the user based on the smaller data size of the second resized media compared with the original media, the second resized media comprising the second psychologically important features of the original media.

Various embodiments include a system for reducing the data size of a media while maintaining a target perceptual quality, comprising: one or more hardware processors configured by machine-readable instructions to perform the following operations: receiving an original media for processing to a target Psychovisual Compression Index (PVCI); determining a plurality of Psychovisual Compression (PVC) metrics for the original media; processing the original media using a trained neural network to identify psychologically important features of the original media using the plurality of Psychovisual Compression (PVC) metrics; generating a resized media based on the plurality of Psychovisual Compression (PVC) metrics and the psychologically important features of the original media, the resized media comprising the psychologically important features of the original media and being a smaller data size compared with the original media; determining a Psychovisual Compression Index (PVCI) for the resized media; comparing the resized media to a threshold of the target Psychovisual Compression Index (PVCI); determining that the resized media satisfies the threshold of the target Psychovisual Compression Index (PVCI); sending the resized media to a website browser on a device of a user, the sending the resized media to the website browser of the user being faster than sending the original media to the website browser of the user based on the smaller data size of the resized media compared with the original media, the resized media comprising the psychologically important features of the original media; receiving a previously detected media, the previously detected media satisfying the threshold of the target Psychovisual Compression Index (PVCI); formatting the previously detected media based on the website browser and a device type of the device of the user to create a reformatted previously detected media; resizing the reformatted previously detected media based on the website browser and the device type to create a resized and reformatted previously detected media; and sending the resized and reformatted previously detected media to the website browser on the device of the user, the sending the resized and reformatted previously detected media using a global content delivery network (CDN), the using the global content delivery network (CDN) decreasing latency of the sending the resized and reformatted previously detected media compared with the sending the resized media.

In various embodiments the resized media is for an image file, the image file being a Psychovisual quality of the original media and being a smaller size compared with the original media.

In various embodiments the resized media is for a video file, the video file being a Psychovisual quality of the original media and being a smaller size compared with the original media.

In various embodiments a format of the original media is one of AV1 Media File Format, Web Picture format, Joint Photographic Experts Group, Joint Photographic Experts Group-2000, Joint Photographic Experts Group-XR, Portable Network Graphic, Graphics Interchange Format, and Scalable Vector Graphics.

In various embodiments the processing the original media using a trained neural network to identify psychologically important features of the original media using the plurality of Psychovisual Compression (PVC) metrics includes removing unnecessary pixels of the original media based on the psychologically important features of the original media.

Various embodiments further include comparing the resized media comprising the psychologically important features of the original media with the original media, the comparing determining that the psychologically important features of the original media in the resized media are the same as the psychologically important features of the original media.

In some embodiments the one or more hardware processors are further configured by machine-readable instructions to further perform the following operations: comparing the resized media comprising the psychologically important features of the original media with the original media, the comparing determining that the psychologically important features of the original media in the resized media are not the same as the psychologically important features of the original media; determining a second plurality of Psychovisual Compression (PVC) metrics for the original media; processing the original media using the trained neural network to identify second psychologically important features of the original media using the second plurality of Psychovisual Compression (PVC) metrics; generating a second resized media based on the second plurality of Psychovisual Compression (PVC) metrics and the second psychologically important features of the original media, the second resized media comprising the second psychologically important features of the original media and being a smaller data size compared with the original media; determining a Psychovisual Compression Index (PVCI) for the second resized media; comparing the second resized media to the threshold of the target Psychovisual Compression Index (PVCI); determining that the second resized media satisfies the threshold of the target Psychovisual Compression Index (PVCI); and sending the second resized media to the website browser on the device of a user, the sending the second resized media to the website browser of the user being faster than sending the original media to the website browser of the user based on the smaller data size of the second resized media compared with the original media, the second resized media comprising the second psychologically important features of the original media.

In some embodiments the one or more hardware processors are further configured by machine-readable instructions to further perform the following operations: iteratively generating resized medias based on the plurality of Psychovisual Compression (PVC) metrics; comparing the iteratively generated resized medias to the threshold of the target Psychovisual Compression Index (PVCI); determining that the iteratively generated resized medias satisfy the threshold of the target Psychovisual Compression Index (PVCI); and sending the iteratively generated resized medias to the website browser on the device of a user, the sending the iteratively generating resized medias to the website browser of the user being faster than sending the original media to the website browser of the user based on the smaller data size of the second resized media compared with the original media.

Figure 6:
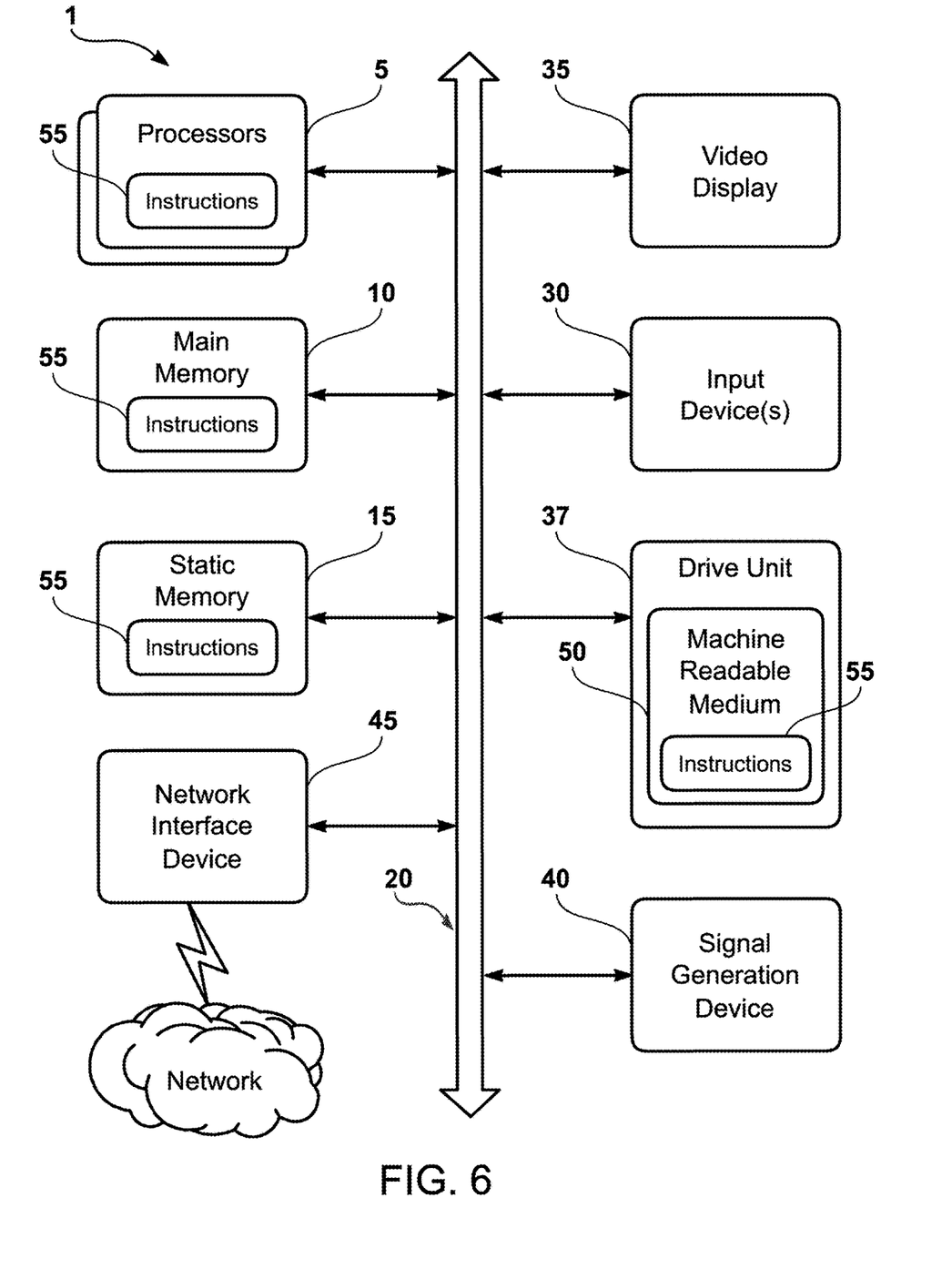
FIG. 6 illustrates an exemplary computer system that may be used to implement embodiments of the present disclosure.

FIG. 6 illustrates an exemplary computer system that may be used to implement embodiments of the present disclosure FIG. 6 shows a diagrammatic representation of a computing device for a machine in the example electronic form of a computer system 1, within which a set of instructions for causing the machine to perform any one or more of the methodologies discussed herein can be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the description, for purposes of explanation and not limitation, specific details are set forth, such as particular embodiments, procedures, techniques, and so forth, in order to provide a thorough understanding of the present technology. However, it will be apparent to one skilled in the art that the present technology may be practiced in other embodiments that depart from these specific details.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

Thus, the technology for processing a media file data to reduce the size of the media file data while maintaining a target perceptual quality of the media file is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for reducing a media data size while maintaining a target perceptual quality, the method comprising:

receiving an original media for processing to a target Psychovisual Compression Index (PVCI);

determining a plurality of Psychovisual Compression (PVC) metrics for the original media;

processing the original media using a trained neural network to identify psychologically important features of the original media using the plurality of Psychovisual Compression (PVC) metrics;

generating a resized media based on the plurality of Psychovisual Compression (PVC) metrics and the psychologically important features of the original media, the resized media comprising the psychologically important features of the original media and being a smaller data size compared with the original media;

determining a Psychovisual Compression Index (PVCI) value for the resized media;

comparing the PVCI value of the resized media to a threshold value of the target Psychovisual Compression Index (PVCI);

determining that the PVCI value of the resized media meets or exceeds the threshold value of the target Psychovisual Compression Index (PVCI);

sending the resized media to a website browser on a device of a user, the sending the resized media to the website browser of the user being faster than sending the original media to the website browser of the user based on the smaller data size of the resized media compared with the original media, the resized media comprising the psychologically important features of the original media;

receiving a previously processed media file having a PVCI value that meets or exceeds the threshold value of the target Psychovisual Compression Index (PVCI);

formatting the previously processed media file based on the website browser and a device type of the device of the user to create a reformatted previously processed media file;

resizing the reformatted previously processed media file based on the website browser and the device type to create a resized and reformatted previously processed media file; and sending the resized and reformatted previously processed media file to the website browser on the device of the user, the sending the resized and reformatted previously processed media file using a global content delivery network (CDN), the using the global content delivery network (CDN) decreasing latency of the sending the resized and reformatted previously processed media file compared with the sending the resized media.

2. The method of claim 1, wherein the resized media is for an image file, the image file being a Psychovisual quality of the original media and being a smaller size compared with the original media.

3. The method of claim 1, wherein the resized media is for a video file, the video file being a Psychovisual quality of the original media and being a smaller size compared with the original media.

4. The method of claim 1, wherein a format of the original media is one of AV1 Media File Format, Web Picture format, Joint Photographic Experts Group, Joint Photographic Experts Group-2000, Joint Photographic Experts Group-XR, Portable Network Graphic, Graphics Interchange Format, and Scalable Vector Graphics.

5. The method of claim 1, wherein the processing the original media using the trained neural network to identify psychologically important features of the original media using the plurality of Psychovisual Compression (PVC) metrics includes removing unnecessary pixels of the original media based on the psychologically important features of the original media.

6. The method of claim 1, further comprising comparing the resized media comprising the psychologically important features of the original media with the original media, the comparing determining that the psychologically important features of the original media in the resized media are the same as the psychologically important features of the original media.

7. The method of claim 1, further comprising:
comparing the resized media comprising the psychologically important features of the original media with the original media, the comparing determining that the psychologically important features of the original media in the resized media are not the same as the psychologically important features of the original media;
determining a second plurality of Psychovisual Compression (PVC) metrics for the original media;
processing the original media using the trained neural network to identify second psychologically important features of the original media using the second plurality of Psychovisual Compression (PVC) metrics;
generating a second resized media based on the second plurality of Psychovisual Compression (PVC) metrics and the second psychologically important features of the original media, the second resized media comprising the second psychologically important features of the original media and being a smaller data size compared with the original media;
determining a Psychovisual Compression Index (PVCI) value for the second resized media;
comparing the PVCI value of the second resized media to the threshold value of the target Psychovisual Compression Index (PVCI);
determining that the PVCI value of the second resized media meets or exceeds the threshold value of the target Psychovisual Compression Index (PVCI); and
sending the second resized media to the website browser on the device of the user, the sending the second resized media to the website browser of the user being faster than sending the original media to the website browser of the user based on the smaller data size of the second resized media compared with the original media, the second resized media comprising the second psychologically important features of the original media.

8. The method of claim 7, further comprising:
iteratively generating resized medias based on the plurality of Psychovisual Compression (PVC) metrics;
comparing the iteratively generated resized medias to the threshold value of the target Psychovisual Compression Index (PVCI);
determining that the iteratively generated resized medias meets or exceeds the threshold value of the target Psychovisual Compression Index (PVCI); and
sending the iteratively generated resized medias to the website browser on the device of the user, the sending the iteratively generated resized medias to the website browser of the user being faster than sending the original media to the website browser of the user based on the smaller data size of the second resized media compared with the original media.

9. An apparatus for reducing a media data size while maintaining a target perceptual quality, comprising:
at least one memory storing computer program instructions; and at least one processor configured to execute the computer program instructions to cause the apparatus at least to perform the following operations:
receiving an original media for processing to a target Psychovisual Compression Index (PVCI);
determining a plurality of Psychovisual Compression (PVC) metrics for the original media;
processing the original media using a trained neural network to identify psychologically important features of the original media using the plurality of Psychovisual Compression (PVC) metrics;
generating a resized media based on the plurality of Psychovisual Compression (PVC) metrics and the psychologically important features of the original media, the resized media comprising the psychologically important features of the original media and being a smaller data size compared with the original media;
determining a Psychovisual Compression Index (PVCI) value for the resized media;
comparing the PVCI value of the resized media to a threshold value of the target Psychovisual Compression Index (PVCI);
determining that the PVCI value of the resized media meets or exceeds the threshold value of the target Psychovisual Compression Index (PVCI);
sending the resized media to a website browser on a device of a user, the sending the resized media to the website browser of the user being faster than sending the original media to the website browser of the user based on the smaller data size of the resized media compared with the original media, the resized media comprising the psychologically important features of the original media;
receiving a previously processed media file having a PVCI value that meets or exceeds the threshold value of the target Psychovisual Compression Index (PVCI);
formatting the previously processed media file based on the website browser and a device type of the device of the user to create a reformatted previously processed media file;
resizing the reformatted previously processed media file based on the website browser and the device type to create a resized and reformatted previously processed media file; and
sending the resized and reformatted previously processed media file to the website browser on the device of the user, the sending the resized and reformatted previously processed media file using a global content delivery network (CDN), the using the global content delivery network (CDN) decreasing latency of the sending the resized and reformatted previously processed media file compared with the sending the resized media.

10. The apparatus of claim 9, wherein the resized media is for an image file, the image file being a Psychovisual quality of the original media and being a smaller size compared with the original media.

11. The apparatus of claim 9, further comprising comparing the resized media comprising the psychologically important features of the original media with the original media, the comparing determining that the psychologically important features of the original media in the resized media are the same as the psychologically important features of the original media.

12. The apparatus of claim 9, further comprising:
comparing the resized media comprising the psychologically important features of the original media with the original media, the comparing determining that the psychologically important features of the original media in the resized media are not the same as the psychologically important features of the original media;
determining a second plurality of Psychovisual Compression (PVC) metrics for the original media;
processing the original media using the trained neural network to identify second psychologically important features of the original media using the second plurality of Psychovisual Compression (PVC) metrics;
generating a second resized media based on the second plurality of Psychovisual Compression (PVC) metrics and the second psychologically important features of the original media, the second resized media comprising the second psychologically important features of the original media and being a smaller data size compared with the original media;
determining a Psychovisual Compression Index (PVCI) value for the second resized media;
comparing the PVCI value of the second resized media to the threshold value of the target Psychovisual Compression Index (PVCI);
determining that the PVCI value of the second resized media meets or exceeds the threshold of the target Psychovisual Compression Index (PVCI); and
sending the second resized media to the website browser on the device of the user, the sending the second resized media to the website browser of the user being faster than sending the original media to the website browser of the user based on the smaller data size of the second resized media compared with the original media, the second resized media comprising the second psychologically important features of the original media.

13. A system for reducing data size of a media while maintaining a target perceptual quality, comprising: one or more hardware processors configured by machine-readable instructions to perform the following operations:
receiving an original media for processing to a target Psychovisual Compression Index (PVCI);
determining a plurality of Psychovisual Compression (PVC) metrics for the original media;
processing the original media using a trained neural network to identify psychologically important features of the original media using the plurality of Psychovisual Compression (PVC) metrics;
generating a resized media based on the plurality of Psychovisual Compression (PVC) metrics and the psychologically important features of the original media, the resized media comprising the psychologically important features of the original media and being a smaller data size compared with the original media;
determining a Psychovisual Compression Index (PVCI) value for the resized media;
comparing the PVCI value of the resized media to a threshold value of the target Psychovisual Compression Index (PVCI);
determining that the PVCI value of the resized media meets or exceeds satisfies the threshold value of the target Psychovisual Compression Index (PVCI);
sending, via a network interface, the resized media to a website browser on a device of a user, the sending the resized media to the website browser of the user being faster than sending the original media to the website browser of the user based on the smaller data size of the resized media compared with the original media, the resized media comprising the psychologically important features of the original media;
receiving a previously processed media file having a PVCI value that meets or exceeds the threshold value of the target Psychovisual Compression Index (PVCI);
formatting the previously processed media based on the website browser and a device type of the device of the user to create a reformatted previously processed media;
resizing the reformatted previously processed media based on the website browser and the device type to create a resized and reformatted previously processed media; and
sending, via the network interface, the resized and reformatted previously processed media to the website browser on the device of the user, the sending the resized and reformatted previously processed media using a global content delivery network (CDN), wherein using the global content delivery network (CDN) decreases latency of the sending the resized and reformatted previously processed media compared with the sending the resized media.

14. The system of claim 13, wherein the resized media is for an image file, the image file being a Psychovisual quality of the original media and being a smaller size compared with the original media.

15. The system of claim 13, wherein the resized media is for a video file, the video file being a Psychovisual quality of the original media and being a smaller size compared with the original media.

16. The system of claim 13, wherein a format of the original media is one of AV1 Media File Format, Web Picture format, Joint Photographic Experts Group, Joint Photographic Experts Group-2000, Joint Photographic Experts Group-XR, Portable Network Graphic, Graphics Interchange Format, and Scalable Vector Graphics.

17. The system of claim 13, wherein the processing the original media using the trained neural network to identify psychologically important features of the original media using the plurality of Psychovisual Compression (PVC) metrics includes removing unnecessary pixels of the original media based on the psychologically important features of the original media.

18. The system of claim 13, further comprising comparing the PVCI value of the resized media comprising the psychologically important features of the original media with the original media, the comparing determining that the psychologically important features of the original media in the resized media are the same as the psychologically important features of the original media.

19. The system of claim 13, wherein the one or more hardware processors are further configured by machine-readable instructions to further perform the following operations:
- comparing the resized media comprising the psychologically important features of the original media with the original media, the comparing determining that the psychologically important features of the original media in the resized media are not the same as the psychologically important features of the original media;
- determining a second plurality of Psychovisual Compression (PVC) metrics for the original media;
- processing the original media using the trained neural network to identify second psychologically important features of the original media using the second plurality of Psychovisual Compression (PVC) metrics;
- generating a second resized media based on the second plurality of Psychovisual Compression (PVC) metrics and the second psychologically important features of the original media, the second resized media comprising the second psychologically important features of the original media and being a smaller data size compared with the original media;
- determining a Psychovisual Compression Index (PVCI) value for the second resized media;
- comparing the PVCI value of the second resized media to the threshold value of the target Psychovisual Compression Index (PVCI);
- determining that the PVCI value of the second resized media meets or exceeds the threshold value of the target Psychovisual Compression Index (PVCI); and
- sending the second resized media to the website browser on the device of a user, the sending the second resized media to the website browser of the user being faster than sending the original media to the website browser of the user based on the smaller data size of the second resized media compared with the original media, the second resized media comprising the second psychologically important features of the original media.

20. The system of claim 19, wherein the one or more hardware processors are further configured by machine-readable instructions to further perform the following operations:
- iteratively generating resized medias based on the plurality of Psychovisual Compression (PVC) metrics;
- comparing the iteratively generated resized medias to the threshold value of the target Psychovisual Compression Index (PVCI);
- determining that the iteratively generated resized medias meet or exceed the threshold value of the target Psychovisual Compression Index (PVCI); and
- sending the iteratively generated resized medias to the website browser on the device of a user, the sending the iteratively generated resized medias to the website browser of the user being faster than sending the original media to the website browser of the user based on the smaller data size of the second resized media compared with the original media.

* * * * *